March 29, 1927.

E. SLADE

BRAKE

Filed April 16, 1925

1,622,681

Inventor
Edward Slade
By his Attorney
Ramsay Hoguet

Patented Mar. 29, 1927.

1,622,681

UNITED STATES PATENT OFFICE.

EDWARD SLADE, OF NEW YORK, N. Y.

BRAKE.

Application filed April 16, 1925. Serial No. 23,445.

This invention relates to a friction brake, and particularly to the method of mounting a brake lining upon a backing and upon a carrier such as a brake band or shoe, and to the article produced thereby.

In the drawings I have illustrated one embodiment of the invention showing a brake lining mounted upon a brake band, but this embodiment is selected merely for the sake of convenience of illustration and description, and it is of course to be understood that the invention is not limited to the construction shown or the method described, except in so far as is necessitated by the claims.

In the drawings—

Figure 1:
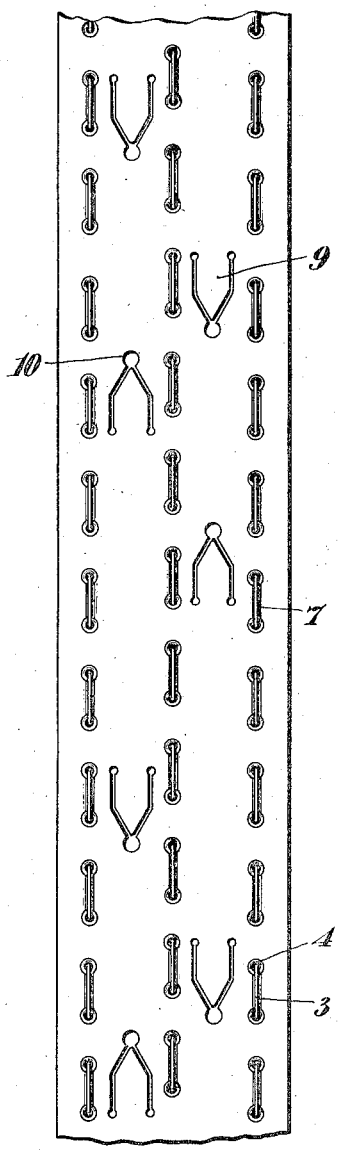
Figure 1 is a fragmentary plan view showing the manner of securing the brake lining to the backing, and showing the disposition of means which are adapted to fasten the lined backing to the carrier.
Figure 2:
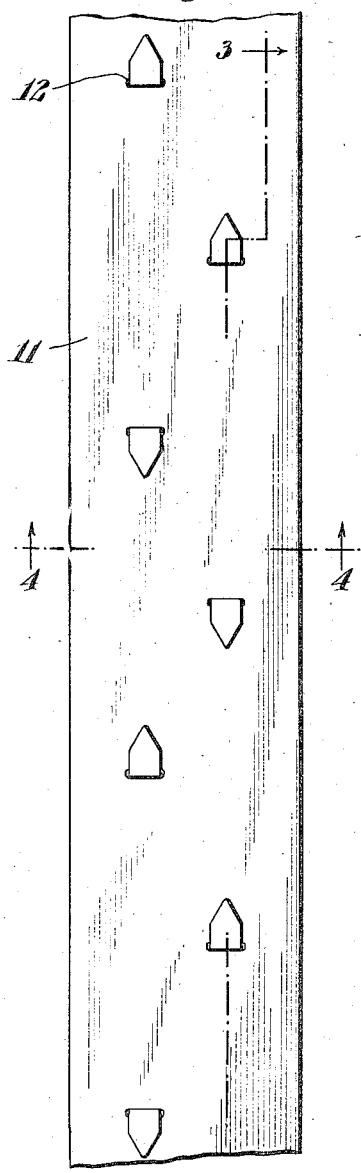
Figure 2 is a similar view showing the lined backing secured to the carrier.
Figure 3:
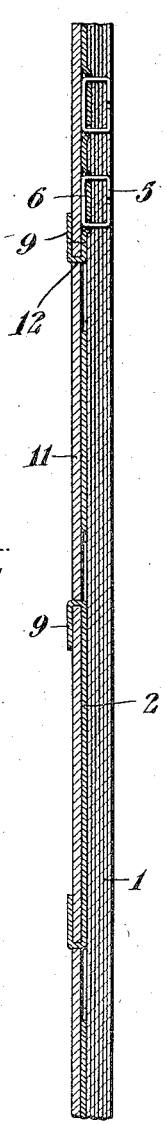
Figure 3 is a staggered sectional view on the line 3—3 of Figure 2, showing the manner in which the lining is secured to the backing and the backing to the carrier.
Figure 4:
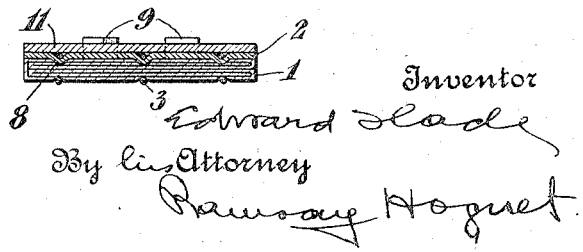
Figure 4 is a sectional view on the line 4—4 of Figure 2.

The embodiment of the article illustrated in the drawing includes a brake lining 1 and backing 2 therefor, which lining may be of any of the well known forms. I consider that the brake lining disclosed in my co-pending application Serial No. 605,524, filed December 7, 1922, is admirably adapted for use and in the combination obtains more satisfactory results than are obtained by other brake linings. This lining includes a fabric in which the weft strands consist of wire inserted hard twisted asbestos and the warp strands of wire, the wire preferably being brass. This fabric in this form of lining is folded back upon itself to produce laminations and the edges turned inwardly so that no raw edges are exposed at the edges of the lining. The lining also is impregnated with a lubricant bearing compound and compressed to the desired degree, the impregnation taking place preferably during the building up of the lining so that the lubricant will be presented to the friction surfaces irrespective of the amount of wear on the lining.

The lining 1 is secured to the backing 2 by metallic stitches 3, which are preferably of brass. These stitches extend through spaced openings 4 in the backing and their ends are turned inwardly toward each other after passing through the brake lining 1 and are clinched in this position, being preferably sunk into the face of the lining. With this arrangement the bight portions 6 of the stitches are located on the face of the backing 2, and in order that they may not extend above the plane of the surface of this backing 2, the backing is provided with depressions 7 which extend between the openings 4, and in which the bight portions of the stitches are located. Furthermore, the extension of the stitches through the lining, and the in-turning of the ends toward each other increases the amount of metal in the lining and of course enhances its efficiency. During use the wear incident thereto will maintain the ends of the stitches in an upset condition and consequently effectively retain the lining 1 upon the backing 2.

It is to be noted, as shown in Figure 1, that the stitches pass through the lining at several transverse points, so that the lining is secured on the backing in a flat condition. I have shown the stitches as arranged in rows, the stitches of one row being staggered with relation to the stitches of the next adjacent row, which staggering increases the efficiency of the attachment by producing an effective zigzag line of securement of the lining to the backing.

The method of forming the brake element when a folded lining such as I have hereinbefore described is used, consists in first impregnating the cloth with the desired lubricant-bearing compound, then cutting the same to the proper size and folding it so that the raw edges are turned inwardly. The lining thus folded is brought to size under pressure so that it assumes a somewhat definite form. This lining is then assembled with the backing, that is, brought face to face with the backing in which backing projections 8 have already been formed incidental to the formation of the depressions 7. With the backing and lining thus assembled the stitches are forced through the openings in the backing, and through the lining, their ends being turned over on the face of the lining. The lining and backing thus assembled are then baked to impart to the lining the necessary wear-resisting qualities and to set the lubricant-bearing compound thoroughly therein. Following this baking operation the lining is pressed upon the backing and squared to shape. This pressure of course clinches the stitches in the lining and forces the projections 8 into the lining. The pressure during the compressing and squaring operation is so great that with the co-operation of the stitches and the projections 8, the lining and backing become substantially a unitary structure.

When a lining of a different form is used it is compressed preferably, after it has been assembled with the backing so that it becomes a unitary structure with the backing.

In order that the backed lining may be attached to a carrier such, for instance, as a brake band or shoe, I have provided the backing with a series of tongues 9, which, in the form illustrated in the drawings, are stamped from the backing. These tongues are formed to extend longitudinally of the backing and in transverse staggered relation. In the embodiment illustrated in the drawings I have shown the tongues arranged in two longitudinal groups. The tongues of each group are arranged so that the end of one tongue extends toward the end of the next adjacent tongue in one direction, and the base of the first tongue extends toward the base of the adjacent tongue in the other direction. This, in effect, is the arranging of the tongues in pairs with the ends of the tongues of each pair extending toward each other and the bases of the tongues of one pair extending toward the bases of the tongues of adjacent pairs.

When the tongues are punched from the backing 9 they of course will be bent up during the mounting of the backed lining on the carrier and, in order to facilitate this bending of the tongues, I have provided an opening 10 adjacent the end of each of the tongues for the accommodation of a tool which may be used in bending the tongues upwardly to such a position that they may be attached to the carrier.

Of course, while this method of forming tongues, and, in fact, the provision of tongues, is most desirable, it is to be understood that I do not wish to be limited to this method, as it is obvious that different means may be provided for attaching the backing to the carrier.

The carrier 11, which in the form illustrated in the drawings is a brake band, is provided with transversely extending openings 12, which are in staggered relation, corresponding to the positions of the bases of the tongues 9. In assembling the backing which carries the lining and the carrier 11, the tongues 9, after having been positioned so that they extend outwardly from the backing, are inserted through the openings 12, and then bent back upon the face of the carrier. The portions of these tongues which extend through and beyond the face of the carrier are bent back upon said face so that each extends in a direction opposite to that of its original position or, in other words, extends towards its own base. The effect of this, of course, is that the portions of the tongues of each pair which project through the carrier extend in opposite directions. In this way any strain which tends to move the backing 2 upon the carrier longitudinally is taken up by the base or the point of attachment of the tongues to the backing.

The portions of the tongues which extend through the carrier are bent back upon the carrier face under pressure so that the backing is tightly secured to the carrier. Furthermore, during this attaching operation the portions of the tongues which are located in the openings 12 are upset to a sufficient degree to bind the tongues within the openings.

While I have illustrated a particular embodiment of the invention, it is to be understood that I do not wish to be limited to the details of this construction, as it is obvious that many changes may be made in the construction without departing from the spirit of my invention, or without exceeding the scope of the claims. For instance, I have shown the lining and backing as being attached to a flat carrier but it is of course obvious that it may be attached to a curved carrier, and the backing may be attached to the carrier by means other than the tongues which I have described simply for the sake of illustration.

What I claim is:

1. In a device of the class described the combination with a brake lining, of a backing therefor and metallic stitches extending through the lining and backing to secure the former to the latter, said stitches having their bight portions arranged on the face of the backing and their ends bent upon the face of the lining.

2. In a device of the class described the combination with a brake lining, of a backing therefor and metallic stitches extending through the lining and backing to secure the former to the latter, said stitches having their bight portions arranged on the face of the backing and the ends bent toward each other upon the face of the lining.

3. In a device of the class described the combination with a brake lining, of a backing therefor and metallic stitches extending through the lining and backing to secure the former to the latter, said stitches having their bight portions countersunk in the face of the backing and their ends bent upon the face of the lining.

4. In a device of the class described the combination with a brake lining including a wire inserted laminated asbestos and metallic stitches for securing the laminations together, of a backing for the lining, said stitches extending through the backing to secure the lining thereto.

5. In a device of the class described the combination with a brake lining including a wire inserted laminated asbestos and metallic stitches for securing the laminations together, of a backing for the lining, said stitches extending through the backing to secure the lining thereto, the stitches having their bight portions located on the face of the backing and their ends bent upon the face of the lining.

6. In a device of the class described the combination with a brake lining of a backing therefor, means for securing the lining to the backing, tongues on the backing for securing the backing to a carrier, said tongues being arranged in longitudinal groups with the tongues of one group staggered with relation to the tongues of the other group.

7. In a device of the class described the combination with a brake lining of a backing therefor, and metallic stitches securing the lining to the backing said backing having portions forced into the lining and forming housings for the bight portions of the stitches.

8. The method of forming a braking element which includes a lining and a backing consisting in forcing stitches into the lining from the backing and forcing projections on the backing into the lining.

9. The method of forming a braking element which includes a lining and a backing consisting in forcing stitches into the lining from the backing and depressing portions of the backing to house portions of the stitches, and clinching the ends of the stitches in the lining.

10. The method of forming a braking element which consists in impregnating the lining cloth, cutting and folding the same, bringing the same to size under pressure, stitching the lining to a metal backing, baking the thus assembled lining, and baking and compressing the stitched lining and backing.

11. The method of forming a braking element which includes stitching a folded lining to a metal backing having projections on the face thereof, and compressing said lining and backing whereby the projections on the backing are forced into the lining and the stitches are clinched in position.

12. In a device of the class described the combination with a brake lining of a backing therefor, metallic stitches extending through the lining and backing to secure the former to the latter, and fastener ears arranged between the metallic stitches.

13. In a device of the class described the combination with a brake lining of a backing therefor, said backing having fastener ears formed between the edges thereof and arranged in longitudinal groups, the alternate ears of each longitudinal group extending in opposite directions.

In testimony whereof, I have signed my name to this specification this 9th day of April, 1925.

EDWARD SLADE.